United States Patent Office 3,267,063
Patented August 16, 1966

3,267,063
POLYURETHANE CAULK CONTAINING KETONE ALDEHYDE RESINS AND PLASTICIZER
George A. Hudson, New Martinsville, W. Va., assignor to Mobay Chemical Company, Pittsburgh, Pa., a corporation of Delaware
No Drawing. Filed Apr. 30, 1962, Ser. No. 191,336
4 Claims. (Cl. 260—33.8)

This invention relates to polyurethane plastics and, more particularly, to polyurethane coatings, caulks and sealants having 100 percent solids and which demonstrate improved adhesion to various substrates.

Polyurethane coatings, caulks and sealants have been heretofore known, however, the adhesion of these materials to various substrates has not been generally satisfactory. This is true especially when the coating or sealant is applied in a thickness exceeding about 5 mils. On unprimed substrates, elastomeric polyurethanes can usually be peeled from the surface to which they have been applied.

Commercially available sealants based on polysulfide polymers have been widely used in applications requiring good adhesion to substrates such as aluminum, glass and concrete. Therefore, it is felt that polyurethane sealants modified to possess improved adhesion to the aforementioned substrates would likewise enjoy commercial acceptance.

It is, therefore, an object of this invention to provide improved polyurethane coatings, caulks and sealants. It is another object of this invention to provide polyurethane coatings, caulks and sealants having improved adhesion to substrates over those heretofore known. It is still another object of this invention to provide a method of preparing elastomeric polyurethane coatings, caulks and sealants having improved adhesion to substrates. It is a further object of this invention to provide a 100 percent solids polyurethane coating, caulk or sealant having improved adhesion to substrates.

The foregoing objects and others are accomplished in accordance with this invention, generally speaking, by preparing a polyurethane coating, caulking or sealing composition utilizing a two-component system wherein the first component includes an organic compound containing active hydrogen atoms which are reactive with —NCO groups and having a molecular weight of from about 90 to about 5,000 and a second component comprising an organic polyisocyanate. This two-component polyurethane system is modified by the addition of a highly polar resinous material having a plurality of recurring ketone groups, and by addition of a plasticizer which is free of groups reactive with isocyanates and which is capable of dissolving the polar resinous material. The invention thus contemplates the addition of a highly polar resinous material, which can be prepared from aliphatic ketones or cyclic ketones with formaldehyde in admixture with a plasticizer capable of dissolving the polar compound to a two-component 100 percent solids polyurethane coating, caulking or sealing composition. Generally, it is preferred to add the modifying materials to the active hydrogen component.

It has been found that when the polar material is used by itself in suitable polyurethane caulking compositions, no improvement in adhesion to substrates such as glass, aluminum or concrete results. However, when a mixture of the highly polar material and a plasticizer which will dissolve the polar material is used, the adhesion of the polyurethane composition to a substrate is generally improved. In some instances, adhesion is improved to the extent that cohesive failure rather than an adhesive failure results when attempts are made to remove the compositions from the substrates. That is, the caulking composition itself fails before the bond between the caulking composition and this substrate fails. This cohesive failure is desirable for caulks and sealants in the construction industry.

As stated previously, the caulking compositions in accordance with this invention are two-component systems wherein one component contains active hydrogen atoms which will react with —NCO groups and the other component contains an organic polyisocyanate. The two-components are then mixed together shortly before use in a ratio such that the —NCO groups to active hydrogen groups are present in a ratio of from about 0.8 to 1.2.

Any suitable compound having a molecular weight from about 90 to about 5,000 and having active hydrogen atoms which are reactive with —NCO groups can be used in the process of this invention to prepare the caulking, sealing or coating compositions such as, for example, monomeric glycols, diamines, amino alcohols and the like; polymers such as, for example, hydroxyl polyesters, polyhydric polyalkylene ethers, polyhydric polythioethers, polyacetals and the like.

Any suitable glycol such as, for example, ethylene glycol, propylene glycol, butylene glycol, amylene glycol, hexane diol, xylylene glycol, 1,5-di(β-hydroxy ethoxy) naphthylene, phenylene di-(β-hydroxy ethyl ether), bis-(hydroxy methyl cyclohexane), trimethylol propane, glycerine, hexanetriol, pentaerythritol, and the like. Any suitable diamine such as, for example, ethylene diamine, propylene diamine, butylene diamine, xylyene diamine, tolylene diamine, triaminobenzene, naphthylene diamine, 4,4′-diamino-diphenyl methane, hexylene diamine and the like may be used. Any suitable amino alcohol such as, for example, amino ethyl alcohol, amino propyl alcohol, amino butyl alcohol and the like may be used.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyladipic acid, glutaric acid, pimelic acid, azelaic acid, phthalic acid, terephthalic acid, isophthalic acid, 1,2,4-benzene tricarboxylic acid, thiodiproponic acid, maleic acid, fumaric acid, citraconic acid, itaconic acid, and the like. Any suitable polyhydric alcohol may be used in the reaction with the polycarboxylic acid to form a polyester such as, for example, ethylene glycol, propylene glycol, butylene glycol, amylene glycol, hexanediol, hexanetriol, glycerine, bis-(hydroxy-methyl-cyclohexane), trimethylol propane, pentaerythritol, and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters, and the like. Any suitable polyester amide may be used such as, for example, the reaction product of an amine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethylamine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid, such as those mentioned above, with relation to the preparation of polyesters. Any suitable ether glycol may be used such as, for example, diethylene glycol, triethylene glycol, 1,4-phenylene-bis-hydroxy ethyl ether, 2,2-diphenyl propane-4,4'-bis-hydroxy ethyl ether and the like.

Any suitable polyhydric polyalkylene ether may be used such as, for example, the condensation product of an alkylene oxide with a small amount of a compound containing groups such as, for example, water, ammonia, ethylene glycol, propylene glycol, butylene glycol, amylene glycol, trimethylol propane, glycerine, pentaerythritol, and the like. Any suitable alkylene oxide condensate may be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257 to 262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-($\beta$-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Any suitable organic polyisocyanate may be used in the preparation of the caulking, coating and sealing compositions in accordance with this invention such as, for example, ethylene diisocyanate, ethylidene diisocyanate, propylene diisocyanate, butylene diisocyanate, hexamethylene diisocyanate, cyclopentylene-1,3-diisocyanate, cyclohexylene - 1,4 - diisocyanate, cyclohexylene - 1,2-diisocyanate, 4,4' - diphenylmethane diisocyanate, 2,2 - diphenylpropane - 4,4' - diisocyanate, p - phenylene diisocyanate, m - phenylene diisocyanate, xylylene diisocyanate, 1,4 - naphthylene diisocyanate, 1,5 - naphthylene diisocyanate, diphenyl - 4,4' - diisocyanate, azobenzene-4,4' - diisocyanate, diphenylsulphone - 4,4' - diisocyanate, dichlorohexamethylene diisocyanate, furfurylidene diisocyanate, 1 - chlorobenzene - 2,4 - diisocyanate, 4,4',4"-triisocyanato - triphenylmethane, 1,3,5 - triisocyanatobenzene, 2,4,6 - triisocyanato - toluene, 4,4,' - dimethyldiphenylmethane - 2,2', 5,5 - tetraisocyanate, and the like. Also suitable for use as the organic polyisocyanates are the reaction products of any of the hydroxyl terminated compounds mentioned above with an excess of an organic diisocyanate such as those set forth immediately above.

In accordance with the invention, the additives which improve the adhesion of polyurethane caulking compositions to the substrates can be added to either the active hydrogen containing component or the polyisocyanate containing component. However, it is preferred that they be added to the active hydrogen containing component. While any amount of the combination of the polar compound in the plasticizer may be used depending upon the particular formulation of the polyurethane material, at least 10% by weight of the mixture based on the weight of the entire polyurethane formulation should be used. Any suitable highly polar resinous material prepared by condensing formaldehyde with an aliphatic ketone or a cyclic ketone may be used. Any suitable aliphatic ketone may be used such as, for example, acetone, methyl ethyl ketone, methyl propyl ketone, methyl isopropyl ketone, methyl-n-butyl ketone, diethyl ketone, diisopropyl ketone, dibutyl ketone and the like. Any suitable cyclic ketone such as, for example, cyclohexanone, cyclobutanone, cycloheptanone, cyclopentanone, and the like may be used. It is preferred, however, to prepare the polar compounds containing a multiplicity of carbonyl groups by condensing formaldehyde with cyclohexanone and methyl ethyl ketone.

Any suitable plasticizer may be used in accordance with this invention so long as they will dissolve the polar compound such as, for example, di(butyl Cellosolve) adipate, di(2-ethylhexyl) adipate, n-octyl n-decyl adipate, diisooctyl adipate, chlorinated biphenyl, diisobutyl adipate, diisooctyl phthalate, tricresyl phosphate, chlorinated paraffin, di(2-ethylhexyl) phthalate (dioctyl phthalate), n-butyl cyclohexyl phthalate, dicyclohexyl phthalate, di(Cellosolve) phthalate, di(2-ethylhexyl) hexahydrophthalate, di-n-hexyl phthalate, triethylene glycol di(2-ethylbutyrate), triethylene glycol di(2-ethylhexanoate), polyethylene glycol, di(2-ethylhexanoate), di(2-ethylhexyl) tetrahydrophthalate, 2-ethylhexanoic acid diester of N,N-bis(2-hydroxyethyl) - 2 - ethylhexanamide, tri(2-ethylhexyl) phosphate, tetra-n-butyl thiodisuccinate, polyethylene glycol dilaurate, di(2-ethylhexyl) adipate, dimethyl sebacate, diisooctyl sebacate, di-n-butyl sebacate, n-butyl benzyl sebacate, di(2-ethylhexyl) sebacate, di(1,3-dimethylbutyl) sebacate, dicapryl sebacate, dibenzyl sebacate, di-n-butyl phthalate, di(1,3-dimethylbutyl) phthalate, dicapryl phthalate, di(1,3-dimethylbutyl) adipate, dicapryl adipate, partially hydrogenated mixture of isomeric triphenyls, methyl Cellosolve oleate, hydrocarbon resin made by reaction of formaldehyde and dimethyl naphthalenes, n-butyl Cellosolve stearate, tri(butyl Cellosolve) phosphate, bis(dimethylbenzyl) carbonate, bis(dimethylbenzyl) ether, di(butyl Cellosolve) phthalate, di(methyl Cellosolve) phthalate, methyl pentachlorostearate, high-boiling alkylated aromatic petroleum fractions, o-xenyl diphenyl phosphate, tri(p-tert-butyl phenyl) phosphate, triethylene glycol dicaprylate, di(butyl Carbitol) formal, di(butyl Carbitol) adipate, di(2-ethylbutyl) azelate, di(2-ethylhexyl) azelate, diethylene glycol dipelargonate, tetrahydrofurfuryl oleate, dinonyladipate, tricresyl phosphate, mono-n-butyl phthalate ester with n-butyl glycolate, monoethyl phthalate ester with ethyl glycolate, N-cyclohexyl-p-toluenesulfonamide, N-ethyl - p - toluenesulfonamide, N-ethyl-o- and -p-toluenesulfonamides, o- and p-toluenesulfonamides, cresyl diphenyl phosphate, 2-ethylhexyl diphenyl phosphate, n-butyl benzyl phthalate, and the like. Of those mentioned above, it is preferred that Aroclors (trademark of Monsanto Chemical Company), which are bi- and terphenyls and the phosphate based plasticizers be used for the reason that these compositions, in addition to providing improvements in the adhesion of the polyurethane materials to the substrate, also increase the flame resistance of the polyurethanes. The compositions of the Aroclors can be found in the Encyclopedia of Chemical Technology, volume 3, page 826 et seq., published by Interscience Publishers, Inc., 1953.

While it is not always necessary, it is desirable in most formulations to add a catalyst to one of the two components, preferably to the hydroxyl containing component to accelerate the hydroxyl —NCO reaction. Any suitable catalyst which promotes this reaction may be used such as, for example, tertiary amines such as, dimethyl aniline, N-ethyl morpholine, diethylamine, triethylene diamine, 1-methyl-4(dimethyl amino ethyl) piperazine and the like; tin compounds such as, tetrabutyl tin, stannous octoate, stannous oleate, dibutyl tin dilaurate and the like. Further, any of the materials which catalyze the hydroxyl —NCO reaction as set forth in an article entitled "Catalysis of the Isocyanate-Hydroxyl Reaction," by J. W. Britain et al., published in Journal of Applied Polymer Science, volume IV, issue 11 (1960) may be used including bismuth nitrate, lead 2-ethylhexoate, lead benzoate, lead oleate, triethylenediamine, sodium trichlorophenate, sodium propionate, lithium acetate, potassium oleate, tributyltin chloride, dibutyltin dichloride, butyltin trichloride, stannic chloride, tributyltin o-phenylphenate, tributyltin cyanate, stannous octoate, stannous oleate, dibutyltin di(2-ethylhexoate), dibenzyltin di(2-ethylhexoate), dibutyltin dilaurate, dibutyltin diisooctylmaleate, dibutyltin sufide, dibutyltin dibutoxide, dibutyltin bis(o-phenylphenate), dibutyltin bis(acetylacetonate), di(2-ethylhexyl)tin oxide, titanium tetrachloride, dibutyltitanium dichloride, tetrabutyl titanate, butoxytitanium trichloride, ferric chloride, ferric 2-ethylhexoate, ferric acetylacetonate, antimony trichloride, antimony pentachloride, triphenylantimony dichloride, uranyl nitrate, cadmium nitrate, cadmium diethyldithiophosphate, cobalt benzoate, cobalt 2-ethylhexoate, thorium nitrate, triphenylaluminum, trioctylaluminum, aluminum oleate, diphenylmercury, zinc 2-ethylhexoate, zinc naphthenate, nickelocene, nickel naphthenate, 1-methyl - 4 - (dimethylaminoethyl) - piperazine, N - ethylethylenimine, N,N,N',N' - tetramethylethylene diamine, triethylamine, 2,4,6 - tri(dimethylaminomethyl)phenol, N - ethylmorpholine, molybdenum hexacarbonyl, cerium nitrate, vanadium trichloride, cupric 2-ethylhexoate, cupric acetate, manganese 2-ethylhexoate and the like.

Furthermore, other substances may be added to the caulking formulation depending upon the desired final use of these materials, for example, fillers and pigments such as clays, titanium dioxide, carbon blacks, ground silica, hydrated aluminum and the like may be used. Further, other materials which may or may not enter into the reaction may be added to the caulking systems such as, for example, tall oil, road tars, silica aerogel and other bodying agents which improve the non-sag properties of the particular caulking composition such as, for example, polyamines and amino alcohols such as set forth in copending applications Serial Nos. 147,195 and 147,160, both filed October 24, 1961.

As stated previously, the isocyanate which is used may be either a monomeric compound or a polyaddition product of a monomeric isocyanate with one of the active hydrogen containing compounds previously mentioned. In the preferred embodiment the polyisocyanate is an —NCO terminated prepolymer prepared by reacting an hydroxyl polyester or a polyhydric polyalkylene ether with a monomeric polyisocyanate. When a prepolymer based on an hydroxyl bearing polyester is used in the particular urethane formulation, it is desired to add a small quantity of pyrogallol to stabilize the percentage of free —NCO groups in the prepolymer. Particularly suitable —NCO terminated prepolymers are prepared by reacting about 100 parts by weight of a polypropylene glycol having a molecular weight of about 2,000 and about 66.7 parts by weight of a polypropylene glycol condensate of glycerine having a molecular weight of about 3,000 with an isomeric mixture of 80% 2,4- and 20% 2,6-tolylene diisocyanate, the isocyanate being used in an amount such that the prepolymer contains from about 6 to about 8% —NCO. Another preferred prepolymer is prepared by reacting an hydroxyl terminated polyester prepared by reacting about 16 mols of adipic acid with about 16 mols of diethylene glycol and about 1 mol of trimethylol propane with a sufficient quantity of an isomeric mixture of 80% 2,4- and 20% 2,6-tolylene diisocyanate to obtain a prepolymer having from about 7 to about 9% —NCO. Of course, any propolymer having terminal —NCO groups can be used in the process of this invention.

In carrying out the process of this invention, it is preferred to add all of the components to the hydroxyl component of the urethane system. The highly polar resinous material, the plasticizer, and catalysts may all be added to the active hydrogen component. To facilitate the formation of a homogeneous mixture, stirring and the use of gentle heating up to about 120° C. can be used. Secondly, the pigments, fillers and the like are incorporated into the active hydrogen component which already contains both the highly polar resinous material and the plasticizer. The polyisocyanate which may either be a prepolymer or a monomeric compound is then added to the active hydrogen containing component shortly before use.

The materials prepared in accordance with this invention may be used in any application where a 100% solids system is desired such as in coatings, caulks and sealants. The materials may be added by any technique known in the art, for example, when the mixture of the active hydrogen containing component and the isocyanate component is fluid enough, the material may be poured. Further, where the material has a higher viscosity and is more like putty in nature, it can be applied to the desired substrate by trowelling, extruding such as in ordinary caulking guns, by doctor blades and the like. Thus, even thin coatings of these materials can be applied where desired. A specific and wide-spread industry for such materials is in the sealing of window panes to metal frames.

The invention is further illustrated but not limited by the following examples in which parts are by weight unless otherwise specified.

*Example 1.—Preparation of the active hydrogen containing component*

About 5 parts of 1,4-butane diol, about 5.5 parts of a chlorinated biphenyl and about 5.5 parts of a highly polar resin prepared by condensing formaldehyde with cyclohexanone and having a melting point of about 80 to 90° C. and a specific gravity of about 1.1 and about 17 parts of coal tar asphalt are blended together and heated to about 120° C. with stirring. When a homogeneous liquid blend is obtained, about 0.1 part by weight of dibutyl tin dilaurate is intimately stirred into the mixture.

An —NCO terminated prepolymer is prepared by reacting a mixture of about 47 parts of a polypropylene ether glycol having a molecular weight of about 2,000 and an hydroxyl number of about 56 and about 31 parts of a polyether triol obtained from glycerine and propylene oxide and having a molecular weight of about 3,000 and an hydroxyl number of about 56 with about 23 parts of a mixture of 80% 2,4- and 20% 2,6-tolylene diisocyanate.

About 67 parts of the —NCO terminated prepolymer is mixed with about 33 parts of the active hydrogen component. The mixed component will remain fluid for about 5 to about 10 minutes after being mixed and can be poured. In about 1 to 1½ hours after pouring, the material is tack-free and has elastomeric properties. This composition has passed the water-immersion adhesion test specified in Int. Fed. spec. ((SS-S–00200A). This is a specification for a sealing compound, two component, elastomeric polymer-type, jet fuel resistant, cold applied, concrete paving.

*Example 2*

An active hydrogen containing component is prepared by mixing with heating to about 120° C., until a homogeneous blend is obtained, about 300 parts of a polyethylene glycol having a molecular weight of about 600 with about 150 parts of bis-(2-ethyl hexyl)-phenyl phosphate, with about 25 parts of methylene dianiline, with about 0.6 part of stannous octoate and with about 150 parts of a highly polar resin containing a plurality of carbonyl groups and prepared by condensing formaldehyde with methyl ethyl ketone. This highly polar resinous material has a melting point of from about 17 to 23° C. and a specific gravity of about 1.18.

To the active hydrogen components is added about 50 parts of titanium dioxide, about 312 parts of kaolin and about 1 part of lamp black. This pigment and filler addition can be accomplished by a simple stirring in of the materials into the active hydrogen compound.

An —NCO terminated prepolymer having about 8% —NCO is prepared by reacting about 910 parts of an hydroxyl polyester having a molecular weight of about 2,000 and an hydroxyl number of about 56 and prepared from about 16 mols of diethylene glycol and 1 mol of trimethylol propane with about 278 parts of an isomeric mixture of 80% 2,4- and 20% 2,6-tolylene diisocyanate.

About 656 parts of the isocyanate-terminated prepolymer are mixed with the filler active hydrogen component. After about 10 minutes, the mixture becomes a non-sag material and can be applied in overhead and in vertical applications. This material has a working life of about two hours and total curing takes about 3 to 5 days at room temperature. This material in most cases will fail cohesively rather than adhesively.

*Example 3*

About 45 parts of 1,4-butane diol, about 50 parts of a highly polar resinous material prepared by condensing formaldehyde with a mixture of methyl ethyl ketone and cyclohexanone, about 50 parts of dibutyl maleate and about 0.2 part of dibutyl tin dilaurate are mixed together at a temperature up to about 120° C. to form a homogeneous blend. About 100 parts of ground silica are then intimately dispersed into this mixture by utilizing a three-roll mill. In a separate container about 600 parts of the isocyanate terminated prepolymer of Example 1 are admixed with about 60 parts of silica aerogel. This isocyanate containing mixture is then intimately combined with the hydroxyl terminated component immediately prior to use. The work life of this reactive mixture is about 6 hours. About 5 to 7 days at about 70° F. is required for the material to obtain a full cure. This cured material exhibits excellent adhesion to glass even after water immersion for 24 hours.

*Example 4*

To about 57 parts of 1,2,6-hexane triol are added about 25 parts of chlorinated biphenyl about 25 parts of the highly polar resin of Example 1, about 492 parts of coal tar asphalt and about 1.4 parts of dibutyl tin dilaurate. To about 600 parts of this hydroxyl containing mixture is added about 600 parts of the —NCO terminated prepolymer of Example 1. This material has a working life of from about 5 to 10 minutes after mixing and is tack-free approximately one hour after pouring. This material shows excellent adhesion to concrete substrates.

*Example 5*

About 19 parts of hydroxyl polyester having a molecular weight of about 2,000 and an hydroxyl number of about 56 and prepared from about 16 mols of adipic acid, 16 mols of diethylene glycol and 1 mol of trimethylol propane are mixed with about 0.5 part of 4,4'-diphenyl methane diamine, about 6 parts hexachloro-biphenyl about 6 parts of the highly resinous material of Example 3, about 0.1 part of dibutyl tin dilaurate and about 3 parts of a crude mixture of organic polyisocyanates obtained for phosgenating the crude mixture of isocyanates obtained by reacting aniline with formaldehyde, said organic polyisocyanates containing about 32% free —NCO, having an amine equivalent of about 140 and containing 0.054% hydrolyzable chloride. This material when applied to concrete cures to a tack-free state within about 10 minutes from the time of the initial mixing and shows good adhesion thereto.

It is of course to be understood that the working examples set forth herein are for the purpose of illustration and that any of the active hydrogen containing compounds set forth above may be used in place of the specific compounds used therein. Further, any organic polyisocyanate, highly polar resinous material, plasticizer, catalyst, or filler can be used throughout the application in place of those specifically used herein.

Although the invention has been described in considerable detail in the foregoing for the purpose of illustration, it is to be understood that variations can be made by those skilled in the art without departing from the spirit of the invention and scope of the claims.

What is claimed is:

1. A polyurethane caulking composition containing a highly polar resinous material prepared by condensing formaldehyde with a ketone selected from the group consisting of acetone, methyl ethyl ketone, methyl propyl ketone, methyl isopropyl ketone, methyl-n-butyl ketone, diethyl ketone, diisopropyl ketone, dibutyl ketone, cyclohexanone, cyclobutanone, cycloheptanone and cyclopentanone, and a plasticizer, said plasticizer being free of groups reactive with isocyanate groups and being capable of dissolving said highly polar resinous material.

2. The composition of claim 1 wherein the plasticizer is a chlorinated biphenyl.

3. The composition of claim 1 wherein the ketone is methyl ethyl ketone.

4. The composition of claim 1 wherein the ketone is cyclohexanone.

References Cited by the Examiner

UNITED STATES PATENTS 3,143,517   8/1964   Heiss.

FOREIGN PATENTS 862,951   1/1953   Germany.

OTHER REFERENCES

"The Technology of Solvents and Plasticizers" (Doolittle), published by John Wiley & Sons, Inc. (1954), New York, page 1007.

MORRIS LIEBMAN, *Primary Examiner.*

ALEXANDER H. BRODMERKEL, *Examiner.*

J. W. BEHRINGER, J. E. CALLAGHAN,
*Assistant Examiners.*